United States Patent [19]

Johansson et al.

[11] 4,136,853

[45] Jan. 30, 1979

[54] SLIDE VALVE

[75] Inventors: Folke L. Johansson, Målsryd; B. F. Staffan Svenning, Fritsla, both of Sweden

[73] Assignee: Atlas Copco Aktiebolag, Nacka, Sweden

[21] Appl. No.: 678,354

[22] Filed: Apr. 19, 1976

Related U.S. Application Data

[63] Continuation-in-part of Ser. No. 658,175, Feb. 17, 1976, abandoned.

[30] Foreign Application Priority Data

Feb. 24, 1975 [SE] Sweden ............ 7502013

[51] Int. Cl.[2] ............ F16K 39/00

[52] U.S. Cl. ............ 251/282; 251/DIG. 1; 137/625.25; 137/625.48; 137/625.66

[58] Field of Search ............ 251/282, DIG. 1, 327; 137/625.2, 625.25, 625.48, 625.66

[56] References Cited

U.S. PATENT DOCUMENTS

| | | | |
|---|---|---|---|
| Re. 25,251 | 10/1962 | Quail | 251/282 |
| 1,704,759 | 3/1929 | Miller | 137/625.25 |
| 2,200,396 | 5/1940 | Martin | 137/625.25 |
| 2,547,116 | 4/1951 | Gould | 251/DIG. 1 |
| 2,828,767 | 4/1958 | Barusch | 137/625.48 |
| 2,858,851 | 11/1958 | Holl | 251/282 |
| 2,931,673 | 4/1960 | Gondek | 251/DIG. 1 |
| 3,028,878 | 4/1962 | Natho | 251/282 |
| 3,145,274 | 8/1964 | Van Scoy et al. | 251/282 |
| 3,170,488 | 2/1965 | Manoogian | 251/282 |
| 3,204,656 | 9/1965 | Moen | 251/282 |
| 3,282,289 | 11/1966 | Vick | 251/282 |
| 3,295,546 | 1/1967 | Carlton | 251/327 |
| 3,422,852 | 1/1969 | Ney | 137/625.66 |
| 3,559,685 | 2/1971 | de Fries | 251/282 |
| 3,575,377 | 4/1971 | Carlton et al. | 251/327 |
| 3,599,672 | 8/1971 | Vliedberk | 137/625.48 |
| 3,612,479 | 10/1971 | Smith, Jr. | 251/DIG. 1 |
| 3,667,504 | 6/1972 | Wittren | 251/DIG. 1 |
| 3,695,299 | 10/1972 | Rodgers | 251/327 |
| 3,729,021 | 4/1973 | Humphrey | 251/DIG. 1 |
| 3,799,199 | 3/1974 | Rumpff | 251/282 |
| 3,820,828 | 6/1974 | Fiddler | 137/625.48 |
| 3,959,024 | 5/1976 | Kirk et al. | 251/282 |

FOREIGN PATENT DOCUMENTS

| | | | |
|---|---|---|---|
| 2352477 | 4/1975 | Fed. Rep. of Germany | 137/625.48 |
| 621732 | 12/1959 | Italy | 251/DIG. 1 |
| 1319522 | 6/1973 | United Kingdom | 137/625.25 |

*Primary Examiner*—William R. Cline
*Assistant Examiner*—H. Jay Spiegel
*Attorney, Agent, or Firm*—Flynn & Frishauf

[57] ABSTRACT

A slide valve comprising a housing in which a slide is movably guided between two oppositely facing, flat contact surfaces. Communication between fluid passages in the housing is accomplished by hollow formed passage means on the slide. Seal rings carried in grooves in the slide maintain sealing contact between the slide and the contact surfaces of the housing and seal off the fluid passages relative to each other. Each seal ring consists of a band-shaped contact member and a resilient support member. The support member is arranged to bias the contact member against the contact surface by a force uniformly distributed over the entire length of the contact member.

23 Claims, 4 Drawing Figures

FIG. 4
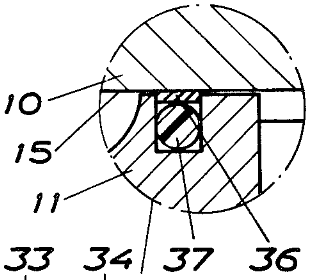
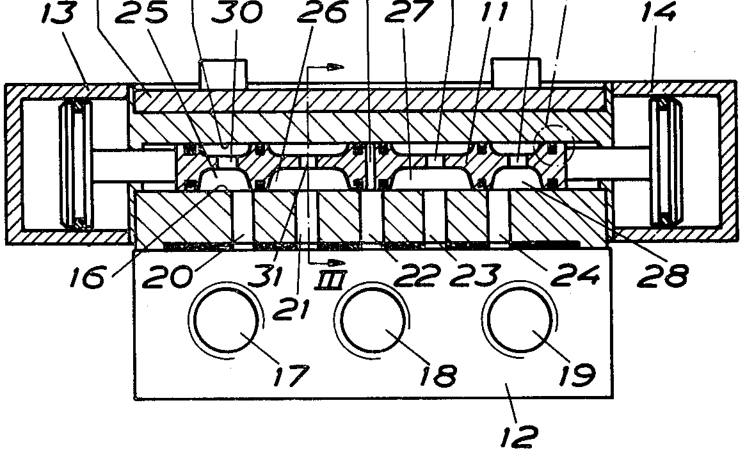
FIG. 1
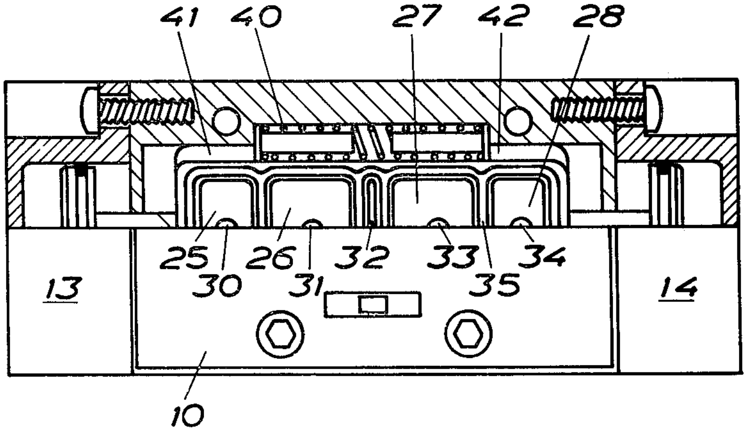
FIG. 2

SLIDE VALVE

BACKGROUND OF INVENTION

This application is a continuation-in-part application of our application, Ser. No. 658,175, filed on Feb. 17, 1976, now abandoned.

This invention relates to an improved slide valve. In particular the invention relates to a slide valve having a valve slide which is arranged to establish and break connections between fluid passages in the valve housing by maintaining sealing contact with two opposite, flat contact surfaces in the housing.

A problem common to valves of this type is to obtain an accurate sealing contact between the slide and the housing. Previous valves have been provided with movable contact elements which are urged against the contact surfaces of the housing by means of springs. Such an arrangement is disadvantageous in bringing about very high manufacturing costs compared to, for instance cylindrical valves. Though the valve is provided with a number of movable parts, which in itself is cost bringing complication, a very careful working of each part is required. By such an arrangement it is possible to eliminate deflections as regard parallelism between the contact surfaces, macro defects, whereas the influence of local defects in the contact surfaces, micro defects, could not be avoided unless the parts of the valve were subjected to a very careful working.

OBJECT OF INVENTION

The present invention intends to solve the above problem by making a slide valve in which an accurate sealing contact between the slide and the housing is accomplished. It is an object of the invention to make a slide valve which does not require any expensive working to obtain an accurate sealing contact between the slide and the housing.

BRIEF DESCRIPTION OF THE DRAWINGS

An embodiment of the invention is hereinbelow described in detail with reference to the accompanying drawings in which FIG. 1 shows a partly broken side elevation of a valve according to the invention;

FIG. 2 shows a horizontal view, partly in section, of the valve in FIG. 1,

FIG. 4 shows, in larger scale, a detail of the valve in FIG. 1.

DETAILED DESCRIPTION

Figure 3:
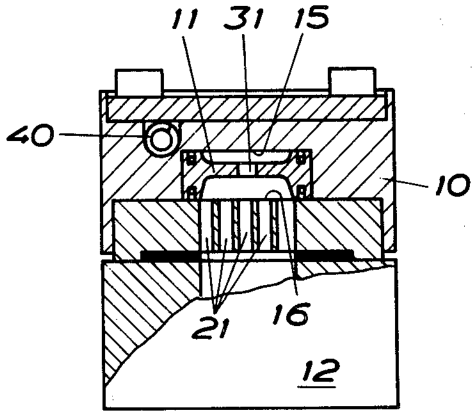
FIG. 3 shows an end view, partly in section, of the valve in FIG. 1.

The valve shown in the drawings is a pneumatic valve for controlling the operation of for instance a motor and comprises a housing 10, a valve slide 11 movably guided in the housing, a connection block 12 attached to the housing 10, and servo motors 13, 14 effective to shift the valve slide 11.

The housing 10 is provided with a valve chamber defined by two oppositely facing contact surfaces 15, 16 between which the slide 11 is guided. As shown in FIG. 1 the connection block 12 is provided with three openings 17, 18, 19, of which 17 and 19 are service ports for connection to a pneumatic motor, and 18 is an inlet port connected to a pressure air source. In the lower part of the valve housing 10 there are five passages 20, 21, 22, 23, 24 of which passages 21 and 23 communicate with openings 17 and 19, respectively, in the connection block 12. Passage 22, communicates with opening 18, and passages 20 and 24 communicate with the atmosphere through outlet openings which are not shown in the drawings. In order to establish a connection between the flow passages 20, 21, 22, 23 and 24 the valve slide 11 is provided with hollows or sections of less thickness which constitute control passages 25, 26, 27 and 28. The width of the hollows or depressions which form the control passages 25–28 is of such a size as to bridge over the relative distance between two adjacent fluid passages.

Moreover, the valve slide 11 is provided with pressure balancing openings 30, 31, 32, 33, 34 of which the openings 30, 31, 33, and 34 are located in the depressed portions which form the control passages of the slide, while the opening 32 is located on a central portion of the slide between the control passages 26 and 27.

The slide is on both sides provided with grooves which surround the control passages 25 to 28 as well as the central balancing opening 32. In the grooves there are supported seal rings 35 for cooperation with the contact surfaces 15, 16 of the housing 10. In the shown embodiment the seal rings 35 are non-circular and have, between the control passages 25, 26, 27 and 28, portions in common so that all of the seal rings 35 on one side of the valve slide 11 are formed in one piece having the appearance of a ladder.

According to the invention each of the seal rings 35 comprises a band-shaped contact member 36 for sliding contact with either of the contact surfaces 15 and 16 of the housing 10 and a support member 37 which is disposed within the groove behind the contact member 36. The support member 37 is arranged to resiliently press the contact member 36 against the contact surface 15 or 16. A cross section through a seal ring 35 is shown in FIG. 4.

The contact member 36 is preferably made of a polyethene (better known in the U.S. as polyethylene) type plastic with an addition of molybdenudisulfide for obtaining self-lubricating properties.

Those parts of the housing 10 that form the contact surfaces 15, 16 may very well consist of anodized aluminum inserts. (Not shown in detail).

The support member 37 is made of rubber which is resilient enough for obtaining a desired adaptability of the contact member 36 relative to the contact surfaces, 15, 16. The purpose of the seal rings is to establish an accurate sealing contact between the valve slide 11 and the housing 10 without demanding a careful and expensive working of the valve parts.

The contact properties of the seal rings are such that occuring deviations in parallelism between the contact surfaces 15, 16 or minor variations in thickness of the slide 11, macro defects, as well as local defects in the contact surfaces 15, 16, micro defects, are absorbed. This is accomplished in that each contact member 36 is biased against the contact surface by a force which is uniformly distributed over the entire length of the contact member.

As the valve is intended for maneuvering a pneumatic cylinder (not shown) the ends of the cylinder would be connected to the service ports 17 and 19 whereas the opening 18 is connected to a pressure air source.

In FIGS. 1 and 2 the valve slide 11 is shown in a central rest position which is defined by a spring 40 lodged in the housing 10. The valve slide 11 is provided with heels 41 and 42 which are arranged to engage the ends of the spring 40. In this position the passage 22 communicating with the pressure air source is closed and the motor to be controlled by the valve remains inactive.

As the slide 11 is shifted to the left in FIG. 1 by activation of the servo motor 14 the control passage 25 of the valve slide 11 provides connection between the passages 22 and 23 whereby pressure air is supplied to the motor to be controlled through service port 19. Simultaneously, the control passage 26 interconnects passages 20 and 21 so that service port 17 is connected to the atmosphere via passage 20.

As the slide 11 is shifted to the right in FIG. 1 by activation of the servo motor 13, a connection is established between passages 23 and 24 and between passages 21 and 22 in a way corresponding to that described above. In this position of the slide 11 service port 17 is connected to the pressure air inlet opening 18, whereas service port 19 is connected to the atmosphere. Thus, the motor to be controlled is pressurized in the opposite direction.

Though all the fluid passages are located on one side of the valve chamber, e.g. they all end in one of the contact surfaces, no transverse forces will arise that will for instance increase the frictional resistance between the slide and housing. The reason is that the openings 30–34 enable air admittance to the opposite side of the slide and that the seal rings encircle areas of corresponding sizes on both sides of the slide.

The disclosed embodiment is described merely by way of example and does not limit the scope of the invention.

What we claim is:

1. A flat-type slide valve comprising:

a housing provided with two substantially parallel, substantially flat contact surfaces, and fluid passages ending in at least one of said contact surfaces, said contact surfaces being rigid and immovable relative to each other in said housing;

a valve slide movably guided between said contact surfaces and having opposite substantially flat sides, each of said substantially flat sides cooperating with a respective one of said contact surfaces of said housing;

said valve slide having passage means for controlling fluid flow through said fluid passages of said housing and for pressure balancing the valve slide; and seal rings carried on said opposite sides of said valve slide and encircling said passage means for maintaining sealing contact with said contact surfaces of the housing;

the improvement wherein:

each of said opposite sides of said valve slide has a plurality of grooves therein which do not communicate with the grooves on the opposite side of the valve slide, said seal rings being retained in said grooves in said valve slide;

each of said seal rings comprises a band-shaped contact member and a resilient support member;

the respective resilient support members and contact members being located in different planes which are substantially parallel to each other as well as to one of said contact surfaces; and said resilient support members of each seal ring being located underneath its respective contact member and in a respective groove for resiliently biasing said respective contact member toward one of said contact surfaces by a force which is substantially uniformly distributed over the entire length of said respective contact member, said contact members being bendable so as to adapt to the adjacent contact surface to maintain sealing contact therewith, said resilient support members comprising the only biasing means for biasing said valve slide relative to said contact surfaces in a direction substantially perpendicular to said contact surfaces.

2. A slide valve according to claim 1, wherein said fluid passages are spaced from each other and all end at spaced apart positions in one and the same of said contact surfaces; and said passage means of said valve slide comprises hollows, each having a given width so as to bridge over the spacing between two adjacent fluid passages of the housing.

3. A slide valve according to claim 2 wherein said seal rings on each side of the valve slide have portions in common with adjacent seal rings and form together a unit.

4. A slide valve according to claim 3 wherein said seal rings together form a generally ladder-shaped unit, said ladder-shaped unit comprising at least two generally elongated members and a plurality of spaced cross-members extending between said generally elongated members.

5. A slide valve according to claim 1 wherein said contact members comprise polyethylene plastic with an addition of molybdenumdisulfide.

6. A slide valve according to claim 1 wherein the portions of said contact surfaces against which said contact members are biased comprise anodized aluminum.

7. A slide valve according to claim 1 wherein said passage means of said valve slide comprises at least one fluid passage on the side of said valve slide adjacent one of said contact surfaces, and at least one pressure balancing passage means on the side of said valve slide adjacent the other of said contact surfaces.

8. A flat-type slide valve comprising:

a housing defining a valve chamber having two substantially flat, oppositely facing guide surfaces, said guide surfaces being rigid and immovable relative to each other in said housing;

fluid passages in said housing and communicating with said valve chamber through openings in at least one of said guide surfaces;

a valve slide movably guided between said guide surfaces in said valve chamber and having opposite substantially flat sides, each of said substantially flat sides cooperating with a respective one of said guide surfaces of said valve chamber;

said valve slide having passage means for controlling fluid flow through said fluid passages of said housing and for pressure balancing the valve slide;

each of said opposite sides of said valve slide having grooves therein which do not communicate with the grooves on the opposite side of the valve slide;

seal means carried by said valve slide for maintaining sealing contact with said guide surfaces to thereby separate said passage means from each other;

said seal means being disposed in respective grooves in said valve slide and comprising at least one band-shaped contact member and at least one resilient support member;

the respective resilient support members and contact members being located in different planes which are substantially parallel to each other as well as to one of said guide surfaces; and said resilient support members of each seal ring being disposed underneath said at least one contact member within said grooves for applying on said at least one contact member a contact pressure which is substantially uniformly distributed over the entire length of said respective contact member, said contact members being bendable so as to adapt to the adjacent guide surface to maintain sealing contact therewith, said resilient support members comprising the only biasing means for biasing said valve slide relative to said guide surfaces in a direction substantially perpendicular to said guide surfaces.

9. A slide valve according to claim 8 wherein the number of said contact members is the same as the number of said support members.

10. A slide valve according to claim 8 comprising a plurality of said contact members and a corresponding plurality of said support members.

11. A slide valve according to claim 10 wherein said support members are all made of a resilient material.

12. A slide valve according to claim 11 wherein said resilient support members apply on their respective contact members a contact pressure which is substantially equally distributed over the entire length of the respective contact members.

13. A slide valve according to claim 8, wherein said fluid passages are spaced from each other and all end at spaced apart positions in one and the same of said contact surfaces; and said passage means of said valve slide comprises hollows, each having a given width so as to bridge over the spacing between two adjacent fluid passages of the housing.

14. A slide valve according to claim 13 wherein said seal rings on each side of the valve slide have portions in common with adjacent seal rings and form together a unit.

15. A slide valve according to claim 8 wherein said contact members comprise polyethylene plastic with an addition of molybdenumdisulfide.

16. A slide valve according to claim 8 wherein the portions of said contact surfaces against which said contact members are biased comprise anodized aluminum.

17. A slide valve according to claim 8 wherein said passage means of said valve slide comprises at least one fluid passage on the side of said valve slide adjacent one of said contact surfaces, and at least one pressure balancing passage means on the side of said valve slide adjacent the other of said contact surfaces.

18. A flat-type slide valve comprising:

a housing having two substantially parallel, substantially flat, oppositely facing guide surfaces, said guide surfaces being rigid and immovable relative to each other in said housing;

a plurality of spaced apart fluid passages in said housing, said fluid passages all ending at spaced apart positions in one and the same of said substantially flat guide surfaces;

a valve slide movably guided in said housing between said guide surfaces and provided with passage means selectively coupling with said fluid passages of said housing for controlling fluid flow through said fluid passages of said housing, said valve slide having opposite substantially flat sides, each of said substantially flat sides cooperating with a respective one of said guide surfaces of said housing;

said passage means of said valve slide comprising hollows in said valve slide, each hollow having a given width so as to bridge over the spacing between two adjacent fluid passages of the housing;

each of said opposite sides of said valve slide having grooves therein which do not communicate with the grooves on the opposite side of the valve slide; and seal means carried in said grooves in said valve slide for engaging said guide surfaces of said housing;

each of said seal means comprising a band-shaped contact member and a resilient support member, the respective said support members and contact members being located in different planes which are parallel to each other as well as to one of said guide surfaces;

said resilient support members of each seal ring being arranged underneath said contact member in said grooves so as to apply a substantially uniformly distributed biasing force over the entire surface of the respective contact member away from said valve slide so that said respective contact member contacts a guide surface of said housing, said contact members being bendable so as to adapt to the adjacent guide surface to maintain sealing contact therewith, said resilient support members comprising the only biasing means for biasing said valve slide relative to said guide surfaces in a direction substantially perpendicular to said guide surfaces.

19. A slide valve according to claim 18 wherein said seal means comprises a plurality of said band-shaped contact members and a corresponding plurality of resilient support members, each of said resilient support members being associated with a respective band-shaped contact member.

20. A slide valve according to claim 18 wherein said seal rings on each side of the valve slide have portions in common with adjacent seal rings and form together a unit.

21. A slide valve according to claim 18 wherein said contact members comprise polyethylene plastic with an addition of molybdenumdisulfide.

22. A slide valve according to claim 18 wherein the portions of said contact surfaces against which said contact members are biased comprise anodized aluminum.

23. A flat-type slide valve comprising:

a housing having two substantially parallel, substantially flat, oppositely facing guide surfaces, and a plurality of fluid passages ending in at least one of said guide surfaces, said guide surfaces being rigid and immovable relative to each other in said housing;

a valve slide movably guided in said housing between said guide surfaces and provided with passage means selectively coupling with said fluid passages of said housing for controlling fluid flow through said fluid passages of said housing, said valve slide having opposite substantially flat sides, each of said substantially flat sides cooperating with a respective one of said guide surfaces of said housing;

said passage means of said valve slide comprising at least one fluid passage on the side of said valve slide adjacent one of said guide surfaces, and at least one pressure balancing passage means on the side of said valve slide adjacent the other of said guide surfaces;

each of said opposite sides of said valve slide having grooves therein which do not communicate with the grooves on the opposite side of the valve slide; and seal means carried in said grooves in said valve slide for engaging said guide surfaces of said housing;

each of said seal means comprising a band-shaped contact member and a resilient support member, the respective said support members and contact members being located in different planes which are parallel to each other as well as to one of said guide surfaces;

said resilient support members of each seal ring being arranged underneath said contact member in said grooves so as to apply a substantially uniformly distributed biasing force over the entire surface of the respective contact member away from said valve slide so that said respective contact member contacts a guide surface of said housing, said contact members being bendable so as to adapt to the adjacent guide surface to maintain sealing contact therewith, said resilient support members comprising the only biasing means for biasing said valve slide relative to said guide surfaces in a direction substantially perpendicular to said guide surfaces.

* * * * *

UNITED STATES PATENT AND TRADEMARK OFFICE

CERTIFICATE OF CORRECTION

PATENT NO. : 4,136,853

DATED : January 30, 1979

INVENTOR(S) : Folke L. JOHANSSON

It is certified that error appears in the above-identified patent and that said Letters Patent are hereby corrected as shown below:

In the Abstract, line 9, change "consists of" to --comprises--.

Signed and Sealed this

*Eighth* Day of *May 1979*

[SEAL]

*Attest:*

RUTH C. MASON
*Attesting Officer*

DONALD W. BANNER
*Commissioner of Patents and Trademarks*